May 16, 1939.  A. F. ERICSON ET AL  2,158,323
BRAKE OPERATING MECHANISM
Filed May 21, 1938   2 Sheets-Sheet 2
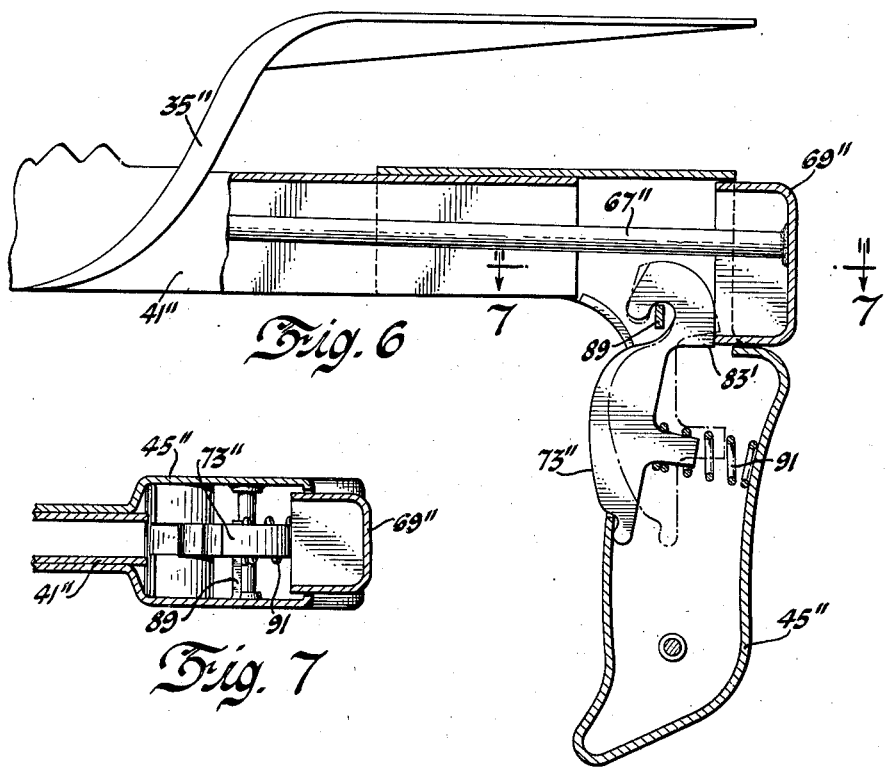
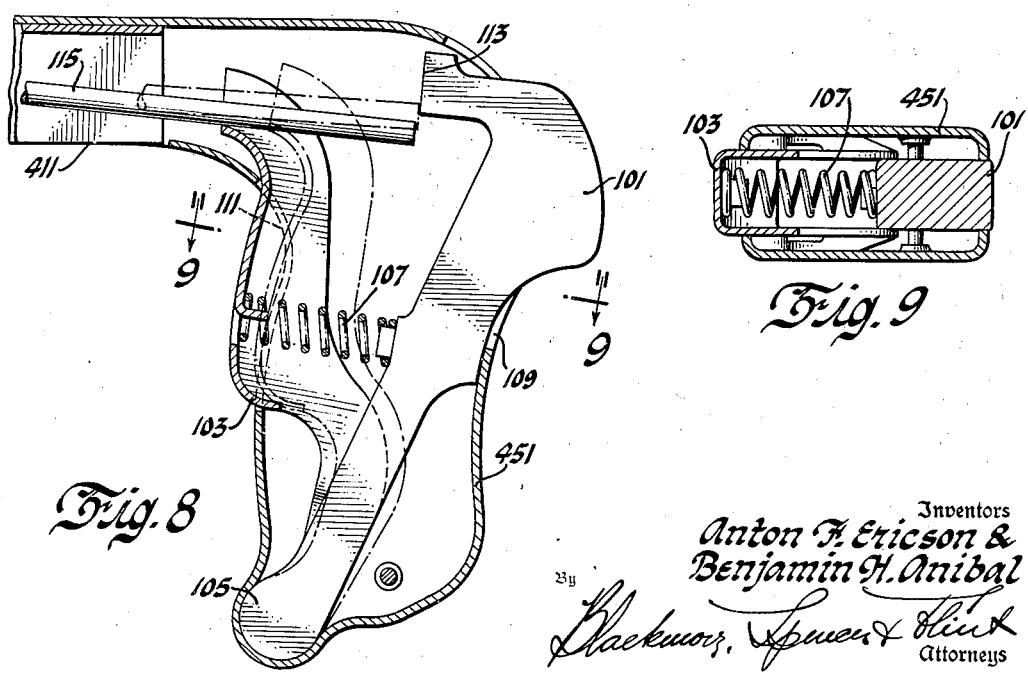
Inventors
Anton F. Ericson &
Benjamin H. Anibal
Attorneys Patented May 16, 1939

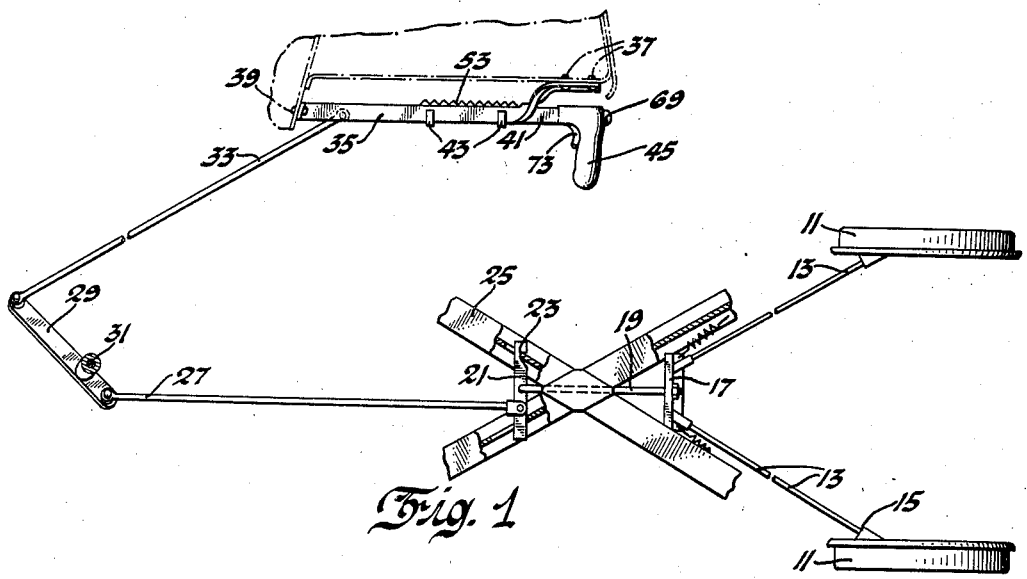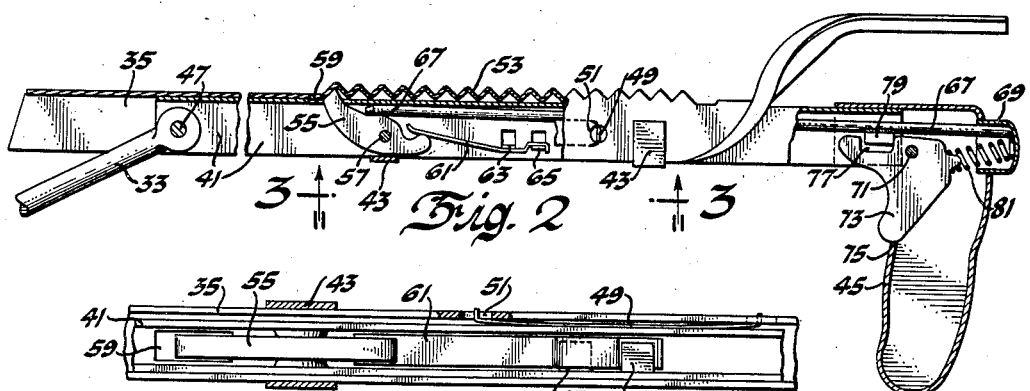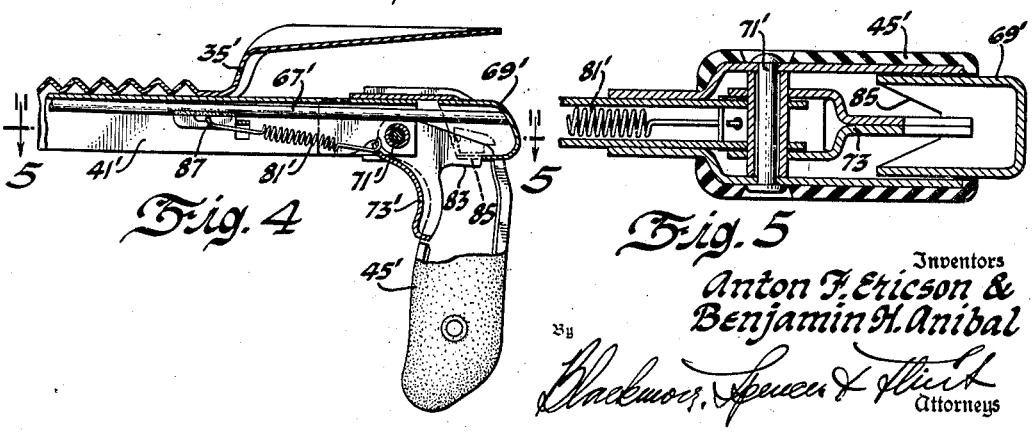

2,158,323

UNITED STATES PATENT OFFICE 2,158,323

BRAKE OPERATING MECHANISM

Anton F. Ericson, Dayton, Ohio, and Benjamin H. Anibal, Pontiac, Mich., assignors to General Motors Corporation, Detroit, Mich., a corporation of Delaware Application May 21, 1938, Serial No. 209,212

7 Claims. (Cl. 74—503)

This invention relates to operating mechanism and, although useful for other purposes, has been designed for applying brakes and particularly to provide an improved operating means for applying a vehicle brake for parking purposes or under conditions of emergency.

An object of the invention is a mechanism which may be located in a position in which it will not interfere with the passengers nor be in the way of other vehicle operating instrumentalities.

Another object is to associate with a manually operable brake applying means a locking pawl and a manually operable member to release the pawl.

A further object is the provision of a manually operable trigger normally functioning to prevent an unintentional operation of the releasing member for the pawl.

Other objects including efficiency in operation and economy in manufacture and installation will be understood from the following description.

The drawings show several modifications of the novel mechanism applied to a motor vehicle.

Figure 1 is a diagrammatic view showing the relation between the brake operating means and the novel brake actuating member.

Figure 2 is a longitudinal section of the brake applying means.

Figure 3 is a view as seen from line 3—3 of Figure 2.

Figure 4 is a longitudinal section of a second embodiment.

Figure 5 is a section on line 5—5 of Figure 4.

Figure 6 is a longitudinal section of a third embodiment.

Figure 7 is a section on line 7—7 of Figure 6.

Figure 8 is a sectional view through the handle of a fourth form of the invention.

Figure 9 is a section on line 9—9 of Figure 8.

Figure 1 shows a plurality of drums 11 which may be the drums associated with the rear wheels of a vehicle. Within these drums there will be used any conventional shoe assembly, the shoes of which are to frictionally engage the drums which rotate with the wheels. The drawing does not show this shoe assembly but it does show cables 13 entering the drums at 15 which cables when pulled serve the purpose of spreading the shoes into frictional contact with the drums. The cables 13 are connected to the ends of an equalizer bar 17, this bar being connected by a rod 19 to a lever 21 fulcrumed at 23 to a frame bar 25. A rod 27 connects the lever 21 to the short end of a second lever 29, lever 29 being pivoted at 31 at any convenient point. A rod 33 is used to connect the long arm of lever 29 to the manually operable means which constitutes the subject matter of this application. The organization described is intended to show how the manually operable means may be used on a motor vehicle for applying rear wheel brakes for parking or for emergency operation. Obviously other details may be used to serve as the transmitting means between the manually operable means and the brake.

In the form of the invention shown by Figures 1, 2 and 3, there is provided an elongated bracket 35. The bracket is of inverted U-shape in section and is secured in any convenient way at 37 and 39 in a position forward of the panel and between the panel and the dash. An inner member also of inverted U-shape is identified by numeral 41. It is located within bracket 35 and reciprocates therein being positioned by and slidable upon suitable guides marked 43. A hollow handle 45 is secured to one end of member 41. Rod 33 is pivotally connected at 47 to the other end of movable member 41. A spring 49 which may be slightly bowed from flat stock is terminally located in openings 51 in one side of the bracket. This spring engages the member 41 and by its resiliency holds the opposite wall of 41 yieldingly against the adjacent wall of the bracket.

The web of the bracket is formed for a portion of its length with ratchet teeth 53. These teeth are intended for engagement with a pawl 55 pivoted at 57 between the side walls of member 41. The member 41 is formed with a short slot 59 through which the pawl projects to engage the ratchet teeth. The pawl is normally biased by a spring 61 so that its end projects through the slot 59 and engages one or another of the ratchet teeth. The spring 61 is positioned and held fixed by tongues 63 and 65 shown by Figure 2.

Slidable through the member 41 is a plunger 67. At one end the plunger engages the pawl, lying between the upper face of the pawl and the web of the member 41. At its outer end it has a cup-shaped head 69 which is slidably mounted in an opening in the handle 45 so that reciprocation to the left (Figure 2) may release the pawl 55 from the ratchet. Within the handle 45 there is pivoted at 71 a trigger 73. The trigger projects through an opening 75 in the handle so that it may be rotated counterclockwise. The trigger has a notch 77 within which may enter a lug 79 projecting from the plunger 67. A coil spring 81 is seated within the bottom of cup 69 and at its other end engages the trigger whereby the lug and notch are engaged so that the plunger 67 may not be pushed by manual effort applied to the head 69 in an effort to release the pawl. In order to so release the pawl it is necessary first to rock the trigger against the resiliency of spring 81 to thereby separate the notch 77 from the lug 79. Subsequent to such release the plunger may be reciprocated to release the pawl.

It will be understood that with the brakes released the member 41 occupies its innermost position within the bracket. For parking the car or for emergency brake operation, handle 45 is pulled rearwardly, the pawl snapping over the teeth of the ratchet and the member 41 being thereby retained in any selected position. To release the brake, the pawl must be removed from engagement with the ratchet. This is accomplished by pushing the plunger 67. The release cannot be accidentally made by an unintended push upon the head 69 for the reason that the plunger is locked and must first be released by the rotation of the trigger. There is thus provided an extremely simple assembly of parts which can be located in a position where it does not interfere with the passengers nor with other car operating mechanism. The use of the trigger is desirable for the reason that the parking brake can only be released by the prior deliberate rotation of the safety trigger.

The other figures show modifications. In Figures 4 and 5 bracket 35', movable member 41', correspond to the parts 35 and 41 already described. The plunger 67' is secured to a head or cap 69' which cap is slidably mounted in the handle 45'. The trigger 73' pivoted at 71' has a part 83 which is movable through a slot 85 formed in the head 69'. A tension spring 81' replaces the compression spring 81. Spring 81' is attached at one end to the trigger 73' and its other end is attached to the plunger at 87. In this form of the invention the plunger cannot be pushed forward until the trigger has been pulled back so that its lug 83 is moved up through the slot 85 and out of the path of movement of the portion of head 69' adjacent the bottom of the slot.

In Figure 6 the bracket and manually movable member are marked 35" and 41", and the member 41" has a handle 45". The plunger 67" carries a head 69" slidable in the handle and normally engaging a part 83' of a trigger 73" which rocks about a handle carried fulcrum member 89. A spring 91 within the handle normally holds the trigger forward with its part 83' obstructing the forward movement of the head 69". In order to move the plunger 67" forward, the trigger is moved against the tension of spring 91 so that part 83' is no longer in the path of movement of the head 69".

Figures 8 and 9 show a handle 451 at the end of a U-shaped operating member 411. Within the handle are two levers 101 and 103, both levers are preferably formed from flat material and have rounded ends 105 mounted within a similar shaped part of the handle. The levers are normally spread apart by a spring 107. The spring pushes lever 101 so that its upper end moves out through a slot 109 and it pushes lever 103 so that its upper end moves out through an opposite slot 111. Lever 101 has a head 113 which may engage the end of a plunger 115. Under the influence of a rocking of lever 101 the plunger may then be pushed forward to release the locking pawl as before. Lever 103 has an upper end underlying the end of plunger 115. When lever 103 is rocked manually from its full line position to its dotted line position it lifts the plunger 115 from its full line position whereby the plunger is brought into the path of movement of the head 113 of the lever 101. To release the pawl therefore lever 103 is rocked to position the plunger and thereafter rocking of lever 101 pushes the plunger and releases the pawl.

We claim:

1. In combination, an elongated bracket of U-shaped in section, said bracket having ratchet teeth formed in its web, a U-shaped member slidably guided in said bracket, motion transmitting means connected to one end of said member, a handle carried by the other end of said member, said member having a slot positioned to lie opposite the ratchet teeth of the bracket, a pawl pivoted within said member and yielding means to project the tip of said pawl through said slot and into engagement with said ratchet teeth.

2. The invention defined by claim 1, together with a plunger reciprocable within said member to release said pawl from said ratchet.

3. The invention defined by claim 1, together with a plunger reciprocable within said member to release said pawl from said ratchet and a trigger pivoted in said handle and yielding means operable upon said trigger to bias the trigger to a position wherein it locks said plunger from said reciprocation.

4. Operating mechanism comprising a fixed ratchet, a manually movable member, said member having a short slot, a pawl pivoted to said member, yielding means to project the end of said pawl through said slot and into engagement with said ratchet, a plunger reciprocable within said movable member to rock said pawl out of engagement with said ratchet and spring operated trigger means to render said plunger inoperable.

5. The invention defined by claim 4, said movable member having a handle, said plunger having a head guided in said handle and said trigger having a part normally to engage and prevent reciprocation of said plunger and head assembly.

6. The invention defined by claim 4, said movable member having a handle, two levers fulcrumed in said handle, yielding means to separate said levers, one of said levers being rotatable against the tension of said yielding means to position the end of said plunger in the path of movement of the other lever.

7. The invention defined by claim 4, said movable member having a handle, said plunger having a head guided in said handle, said trigger having a part biased into contact with said head by its spring and manually rotatable against the action of said spring to space said part from said head.

ANTON F. ERICSON.
BENJAMIN H. ANIBAL.